United States Patent [19]
Sakamoto et al.

[11] Patent Number: 6,026,164
[45] Date of Patent: *Feb. 15, 2000

[54] COMMUNICATION PROCESSING SYSTEM WITH MULTIPLE DATA LAYERS FOR DIGITAL TELEVISION BROADCASTING

[75] Inventors: Noriya Sakamoto, Chigasaki; Atsushi Hirota; Shuuichi Shibaoka, both of Yokohama, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/702,607
[22] PCT Filed: Dec. 26, 1995
[86] PCT No.: PCT/JP95/02682
§ 371 Date: Aug. 27, 1996
§ 102(e) Date: Aug. 27, 1996
[87] PCT Pub. No.: WO96/20563
PCT Pub. Date: Jul. 4, 1996

[30] Foreign Application Priority Data

Dec. 27, 1994 [JP] Japan .................................. 6-324114
May 31, 1995 [JP] Japan .................................. 7-134326

[51] Int. Cl.[7] .................................................. H04L 7/167
[52] U.S. Cl. ............................................. 380/10; 348/385
[58] Field of Search ....................... 380/10, 20; 348/385

[56] References Cited

U.S. PATENT DOCUMENTS

| | | | |
|---|---|---|---|
| 3,580,989 | 5/1971 | Banning, Jr. | 380/10 |
| 5,267,021 | 11/1993 | Ramchandran et al. | 358/12 |
| 5,461,674 | 10/1995 | Citta | 380/10 |
| 5,600,721 | 2/1997 | Kitazato | 380/20 |

FOREIGN PATENT DOCUMENTS

| | | |
|---|---|---|
| 7-15715 | 1/1995 | Japan . |
| 7-115638 | 5/1995 | Japan . |

*Primary Examiner*—Gilberto Barrón, Jr.
*Attorney, Agent, or Firm*—Pillsbury Madison & Sutro LLP

[57] ABSTRACT

Video signals are encrypted so that only the privileged viewers can watch them. A layer coding unit divides video signals into two layers and encodes each layer. An encrypting unit encrypts the low-quality layer data items according to the setting signal from a secret level setting unit and supplies the encrypted signal to a combining unit. Another encrypting unit encrypts the high-quality layer data items according to the setting signal from a secret level setting unit and supplies the encrypted signal to the combining unit. Ideally the high-quality layer data items are encrypted at a secret level that is higher than the secret level used to encrypt the low-quality layer data items. The synthesized data from the combining unit is converted at a communication modem into communication data, which is transmitted to a reception apparatus.

24 Claims, 7 Drawing Sheets

COMMUNICATION PROCESSING SYSTEM WITH MULTIPLE DATA LAYERS FOR DIGITAL TELEVISION BROADCASTING

This application claims benefit of international application PCT/JP95/02682 filed Dec. 26, 1995.

TECHNICAL FIELD

The present invention relates to a transmission apparatus and a reception apparatus that are useful for pay TV broadcasting for which viewers have to pay TV license fees or for protection of copyrights, and to a communication processing system that integrates these apparatuses.

Furthermore, the present invention relates to a digital television broadcasting system which is an example of a communication processing system and which performs a scrambling process on digital television signals and broadcast them, and more particularly to pay broadcasting techniques.

BACKGROUND ART

Recently, communication processing systems where viewers each make a contract with the sender and where only the receivers given the special right are allowed to watch the programs have become desirable for pay TV systems that charge the viewers TV licence fees as well as for the protection of copyrights.

Accordingly, an object of the present invention is to provide a transmission system and a reception system that permit only the privileged viewers under contract with the sender for reception of pay TV broadcasting to watch the programs, and a communication processing system that integrates these apparatuses.

Another object of the present invention is to provide a transmission system and a reception system that are capable of recording, editing, and exchanging the contents of communications with a third party, and a communication processing system that integrates these apparatuses.

In recent years, as video and audio digital signal processing technology have made remarkable progress, more and more research effort has been directed worldwide toward systems that realize digital television broadcasting and the fusion of broadcasting and communication. In this movement, some of the most important techniques are video and audio compression techniques.

Major compression techniques are MPEG, JPEG, and H.261. The schemes proposed by ISO/IEC 1318-1 (Moving Picture Experts Group (ISO/IECJTC1/SC29/WG11)) are now under examination for worldwide standardization of broadcasting, communications, and storage media.

ISO/IEC 13818-1 has determined not only an image compression scheme but also a scheme for a section where the transmission side compresses the video and audio data items of programs separately, generates and multiplexes the bit streams, and broadcasts the multiplexed signal, and a scheme for a control section that enables reception of a specified program on the reception side.

With the advances in digital signal processing techniques, pay digital television broadcasting has been considered. One of the most important problems here is the technique for charging the viewers.

As a conventional technique for dealing with this problem, a scrambling scheme has been proposed which is characterized by generating random numbers without changing the code length in a compression layer complying with the MPEG standard. Since MPEG uses variable-length quantization techniques, however, it is very difficult to effect scrambling without changing the code length.

With this backdrop, Matsushita's Image Laboratory has proposed a scheme at a meeting of the Electronic Data Communication Society of Japan in December, 1992. The scheme is such that the entire quantization scale or the entire fixed-length code of the DCT direct-current component is multiplied by PN, whereas for a motion vector or a variable-length code of the DCT alternating-current component, the codes in the code book are multiplied by PN.

With this scheme, when the compression-decoded images without descrambling are viewed, the contents of the images can hardly be understood, so that pay broadcasting can be realized by delivering descrambling units to the subscribers who have paid charges.

This scheme, however, has a disadvantages in that encoding and decoding are very difficult. Additionally, because the contents of programs cannot be understood without descrambling, it is difficult to let viewers other than the subscribers know the good points of the contents of programs.

If the resolution can be lowered to the extent that the contents of a program can be understood, it is possible to allow the program to appeal to would-be subscribers and motivate them to subscribe to the service. The above scheme with which would-be subscribers cannot recognize the contents of programs, however, can be considered to be unsuitable for practical broadcasting services.

As described above, in a digital television broadcasting system, with the conventional scramble broadcasting scheme, not only are encoding and decoding very difficult, but also the contents of programs can hardly be understood when the compression-decoded images are viewed without descrambling in the case of pay TV service. As a result, it is difficult to appeal to would-be subscribers and therefore, they are not motivated to subscribe to the service.

Accordingly, an object of the present invention is to provide as an example of the communication processing system a digital television broadcasting system as an example of the communication processing system which, even when a scrambled program is selected and decoded without descrambling, enables the program to be viewed to the extent that the contents of the program can be understood.

DISCLOSURE OF THE INVENTION

A first transmission apparatus according to the present invention comprises: layer coding means for dividing data into m (m is an integer not less than 2) layers and coding each layer; encrypting means for encrypting (m−1) layer data items from the layer coding means excluding the lowest-quality layer data item; and combining means for combining the lowest-quality layer data item from the layer coding means and the encrypted (m−1) layer data items from the encrypting means.

A first reception apparatus according to the present invention comprises: separating means that receives the synthesized data obtained by dividing data into m (m is an integer not less than 2) layers, coding each layer, encrypting (m−1) layer data items excluding the lowest-quality layer data item, and combining the lowest-quality layer data item and the (m−1) encrypted layer data items, and that separates the synthesized data into (m−1) encrypted layer data items and the lowest-quality layer data item; decrypting means for decrypting the (m−1) encrypted layer data items from the separating means; and layer decoding means for decoding the (m−1) layer data items from the decrypting means and the lowest-quality layer data item from the separating means.

A first communication processing system according to the present invention comprises: a transmission apparatus comprising: layer coding means for dividing data into m (m is an integer not less than 2) layers and coding each layer; encrypting means for encrypting (m−1) layer data items from the layer coding means excluding the lowest-quality layer data item; and combining means for combining the lowest-quality layer data item from the layer coding means and the (m−1) encrypted layer data items from the encrypting means; and a reception apparatus comprising: separating means for separating the synthesized data created at the combining means into (m−1) encrypted layer data items and the lowest-quality layer data item; decrypting means for decrypting the (m−1) encrypted layer data items from the separating means; and layer decoding means for decoding the (m−1) layer data items from the decrypting means and the lowest-quality layer data item from the separating means.

A second transmission apparatus according to the present invention comprises: layer coding means for dividing data into m (m is an integer not less than 2) layers and coding each layer; encrypting means for encrypting e (e is an integer not less than 2) high-quality layer data items from the layer coding means; and combining means for combining (m−e) low-quality layer data items from the layer coding means and the e encrypted layer data items from the encrypting means.

A second reception apparatus according to the present invention comprises: separating means that receives the synthesized data obtained by dividing data into m (m is an integer not less than 2) layers, coding each layer, encrypting e (e is an integer not less than 2) high-quality layer data items, and combining the remaining (m−e) low-quality layer data items and the e encrypted layer data items, and that separates the synthesized data into e encrypted layer data items and (m−e) low-quality layer data items; decrypting means for decrypting the e encrypted layer data items from the separating means; and layer decoding means for decoding the e layer data items from the decrypting means and the (m−e) low-quality layer data items from the separating means.

A second communication processing system according to the present invention comprises: a transmission apparatus comprising: layer coding means for dividing data into m (m is an integer not less than 2) layers and coding each layer; encrypting means for encrypting e (e is an integer not less than 2) high-quality layer data items from the layer coding means; and combining means for combining (m−e) low-quality layer data items from the layer coding means and the e encrypted layer data items from the encrypting means; and a reception apparatus comprising separating means for separating the synthesized data created at the combining means into e encrypted layer data items and (m−e) low-quality layer data items; decrypting means for decrypting the e encrypted layer data items from the separating means; and layer decoding means for decoding the e layer data items from the decrypting means and the (m−e) low-quality layer data items from the separating means.

With the first transmission apparatus or the transmission apparatus of the first communication system constructed as described above, for example, the layer coding means divides video signals into two layers and codes each layer. After the high-quality ones of the layer data items have been encrypted, the encrypted data items are combined with the low-quality layer data items. Then, the resulting signal is transmitted to the reception apparatus side.

With the first reception apparat us or the reception apparatus of the first communication system constructed as described above, the received synthesized data is separated into the encrypted high-quality layer data items and the low-quality layer data items and the encrypted high-quality layer data items are decrypted. The decrypted high-quality layer data items and the low-quality layer data items are decoded by layer.

Because the high-quality layer data items are encrypted, they can be viewed by only the privileged viewers having the proper decrypting means.

By further providing storage means on the reception apparatus side, the received synthesized data can be recorded or edited. Use of the storage means enables data exchange of the low-quality layer data items with a third party other than the privileged viewers. For the high-quality layer data items, the storage means enables data exchange of these items plus the low-quality layer data items with only the privileged viewers.

With the second transmission apparatus or the transmission apparatus of the second communication system constructed as described above, for example, the layer coding means divides video signals into two layers and codes each layer. The low-quality layer data items and the high-quality layer data items are encrypted at different secret levels. These encrypted low-quality layer data items and high-quality layer data items are decrypted. The decrypted signal is transmitted to the reception apparatus side.

With the second reception apparatus or the reception apparatus of the second communication system constructed as described above, the received synthesized data is separated into the encrypted low-quality layer data items and high-quality layer data items and these layer data items are decrypted separately. The decrypted low-quality layer data items and high-quality layer data items are decoded by layer.

Since the both of the low-quality layer data items and high-quality layer data items are encrypted at different secret levels, they can be viewed by only the privileged viewers having the proper decrypting means.

By further providing storage means on the reception apparatus side, the received synthesized data can be recorded or edited. Use of the storage means enables data exchange with only the privileged viewers.

A digital television broadcasting system of the present invention is a system that converts digital television signals into a plurality of encoded signals differing in resolution, layers these signals, and broadcasts them, and is characterized by comprising: scrambling means that is provided on the transmission side and performs a scrambling process on only the high layer ones of the plurality of encoded signals; and descrambling means that is provided on the reception side and performs a descrambling process on the encoded signals subjected to the high layer scrambling process, wherein for the high layer encoded signals, the output of the descrambling means undergoes a decoding process, whereas for the low layer encoded signals, the decoding process is performed without the descrambling process.

With the digital television broadcasting system, because only the high layer ones of the layered encode signals are subjected to the scrambling process and then broadcasted, the broadcasting service of the high layer encoded signals cannot be received on the reception side unless the high layer encoded signals are subjected to the descrambling process. Since the low layer encoded signals have not been scrambled, the decoding of these signals enables viewers to view them, allowing the viewer to understand the contents of the programs.

DETAILED DESCRIPTION OF THE PRESENTLY PREFERRED EXEMPLARY EMBODIMENTS

Hereinafter, referring to the accompanying drawings, embodiments of the present invention will be explained in detail.

Figure 1:
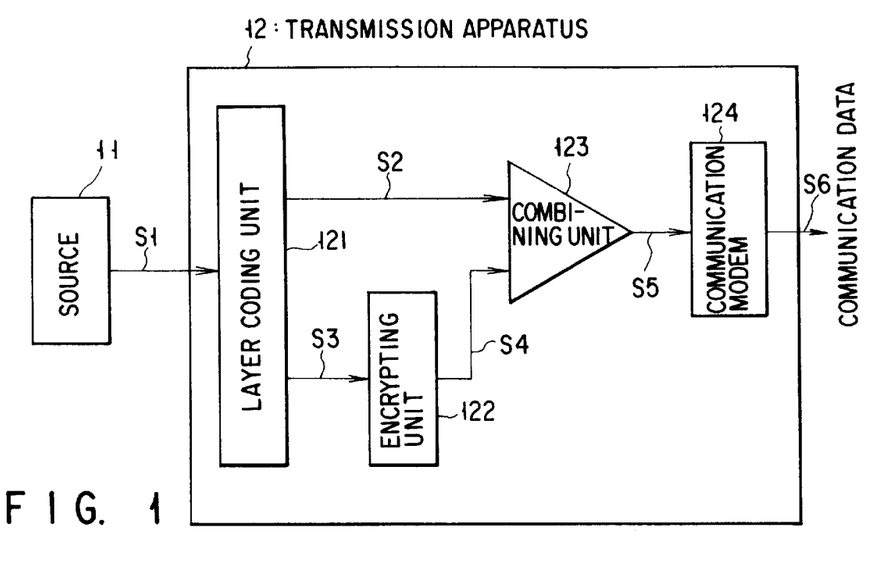
FIG. 1 is a block diagram of a first embodiment of a transmission apparatus according to the present invention.

FIG. 1 shows a first embodiment of a transmission apparatus according to the present invention.

The transmission apparatus 12 of the embodiment carries out a coding process by dividing a video signal S1 from a source 11 into two layers.

Specifically, the transmission apparatus 12 is used as a server for pay TV broadcasting. The video signal S1, the contents of communication, from the external source 11 is supplied to a layer coding unit 121. The layer coding unit 121 divides the video signal S1 into two layers, encodes them, and outputs low-quality layer data S2 and high-quality layer data S3.

An encrypting unit 122 encrypts the high-quality layer data S3 and outputs the encrypted high-quality layer data S4. A combining unit 123 combines the encrypted high-quality layer data S4 and the low-quality layer data S2 and outputs the synthesized data S5. A communication modem 124 converts the synthesized data S5 into data having communication characteristics suitable for a communication path (not shown) and outputs communication data S6.

Figure 2:
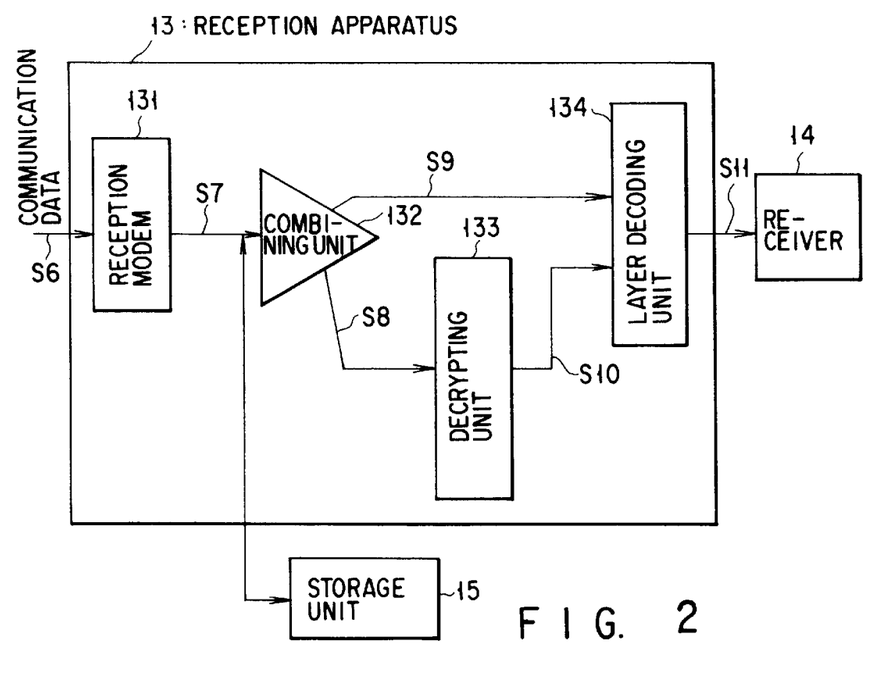
FIG. 2 is a block diagram of a first embodiment of a reception apparatus according to the present invention.

FIG. 2 shows a first embodiment of a reception apparatus according to the present invention. The reception apparatus 13 of the embodiment is used for a set top box in pay TV broadcasting. The communication data S6 transmitted via a communication path (not shown) is inputted to a reception modem 131. The reception modem 131 converts the transmitted data S6, which is the reverse of the conversion at the communication modem 124 in the transmission apparatus 12 and reproduces the synthesized data S7.

A separating unit 132 separates the synthesized data S7 into encrypted high-quality layer data S8 and low-quality layer data S9. A decrypting unit 133 decrypts the encrypted high-quality layer data S8 and reproduces the high-quality layer data S10.

If failing in decryption, such as when the key of the encrypted high-quality layer data S8 is wrong, the decrypting unit 133 outputs data that is against the layer coding grammar. When the ungrammatical data is inputted, a layer decoding unit 134 evaluates only the low-quality layer data S9 and reproduces the video signal S11.

The video signal S11 from the layer decoding unit 134 is supplied to an external receiver 14, which displays images.

With the above configuration, as described above, because the high-quality layer data S3 is encrypted and then transmitted, the image of the high-quality layer data S3 cannot be viewed unless not only the layer decoding unit 134 but also the decrypting unit 133 are provided on the reception apparatus 13 side.

Furthermore, a storage unit 15 stores and reproduces the synthesized data S7 from the reception modem 131. The recording medium may be magnetic tape or floppy disks, for example. Use of another storage unit enables the synthesized data S7 to be edited.

Use of a recording medium on which the synthesized data S7 has been recorded enables data exchange with a third party (i.e., a person under contract with the sender) having a reception apparatus of the same configuration as FIG. 2. If the reception apparatus of the third party has at least the layer decoding unit 134, the third party can view the images of low-quality layer data, but cannot view the high-quality layer data unless having the decrypting unit 133. Therefore, viewing cannot be done without permission and if copying is effected without permission, what has been copied will be useless, with the result that copying without permission can be prevented.

Additionally, when the image of the synthesized data S7 recorded or that of the synthesized data S7 received from a third party is reproduced, the synthesized data S7 is reproduced from the storage unit 15 and is supplied to the separating unit 132. The data passes through the aforementioned processes and reaches the receiver 14, which displays images.

While in the embodiment, an example of coding in two layers has been explained, the layer coding unit 121 may divide the video signal S1 into m layers and code the individual layers. At this time, the encrypting unit 122 may encrypt (m−1) layer data items excluding the lowest-quality layer data item (the lowest resolution data item). Accordingly, the decrypting unit 133 decrypts the (m−1) layer data items. The encrypting unit 122 may encrypt e high-quality layer data items. In this case, the decrypting unit 133 decrypts the e layer data items accordingly.

Figure 3:
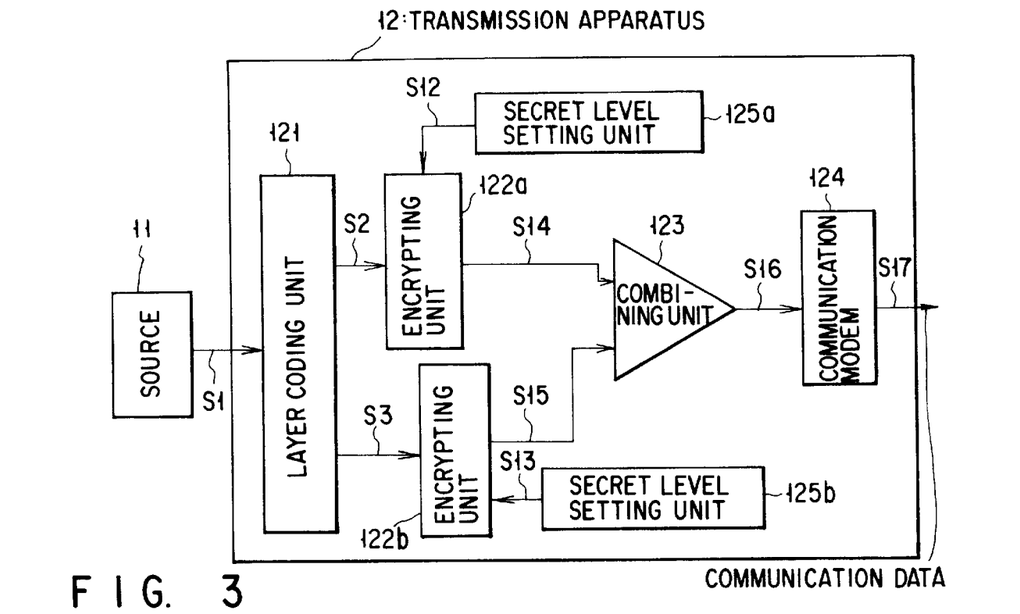
FIG. 3 is a block diagram of a second embodiment of a transmission apparatus according to the present invention.

FIG. 3 shows a second embodiment of the transmission apparatus according to the present invention. This embodiment performs a coding process by dividing the video signal from a source into two layers.

The transmission apparatus 12 is used as a server for pay TV broadcasting. The video signal S1, the contents of communication, from the external source 11 is supplied to a layer coding unit 121. The layer coding unit 121 divides the video signal S1 into two layers, encodes them, and outputs low-quality layer data S2 and high-quality layer data S3.

A secret level setting unit 125a generates a secret level setting signal S12 that sets the secret level of encryption of the low-quality layer data S2 and supplies it to an encrypting unit 122a. Receiving the secret level setting signal S12, the encrypting unit 122a determines the secret level from the complexity of the encrypting scheme, the length of the encryption key, and the number of encryptions repeated, and encrypts the low-quality layer data S2.

A secret level setting unit 125b generates a secret level setting signal S13 that sets the secret level of encryption of the high-quality layer data S3 and supplies it to an encrypting unit 122b. The secret level setting signal S13 sets a secret level higher than that of encryption of the low-quality layer data S2. Receiving the secret level setting signal S13, the encrypting unit 122b determines the secret level from the complexity of the encrypting scheme, the length of the encryption key, and the number of encryptions repeated, and encrypts the high-quality layer data S3.

A combining unit 123 combines the encrypted low-quality layer data S14 and high-quality layer data S15 and outputs the synthesized data S16. A communication modem 124 converts the synthesized data S16 into data having communication characteristics suitable for a communication path (not shown) and outputs communication data S17.

A second embodiment of a reception apparatus of the present invention will be described by reference to FIG. 4. The reception apparatus 13 is used for a set top box in pay TV broadcasting. The communication data S17 transmitted from the transmission apparatus 12 via a communication path (not shown) is inputted to a reception modem 131. The reception modem 131 converts the transmitted data S17, which is the reverse of the conversion at the communication modem 124 and reproduces the synthesized data S18.

A separating unit 132 separates the synthesized data S18 into encrypted low-quality layer data S19 and high-quality layer data S20. A decrypting unit 133a decrypts the encrypted low-quality layer data S19 and reproduces the low-quality layer data S21. A decrypting unit 133b decrypts the encrypted high-quality layer data S20 and reproduces the high-quality layer data S22.

A layer decoding apparatus 134 decodes the low-quality layer data S21 and high-quality layer data S22 to reproduce a video signal S23.

If failing in decryption, such as when the key of the encrypted high-quality layer data S20 is wrong, the decrypting unit 133b outputs data that is against the layer coding grammar. When the ungrammatical data is inputted, the layer decoding unit 134 evaluates only the low-quality layer data S21 and reproduces the video signal S1.

Additionally, if failing in decryption, such as when the key of the encrypted low-quality layer data S14 is wrong, the decrypting unit 133a outputs data that is against the layer coding grammar. When the ungrammatical data is inputted, the layer decoding unit 134 outputs a video signal S23 of a blue back screen corresponding to no input.

The video signal S23 from the layer decoding unit 134 is supplied to an external receiver 14, which displays images or a blue back screen.

As described above, because the low-quality layer data S2 and high-quality layer data S3 are encrypted and then transmitted, the images cannot be viewed unless not only the layer decoding unit 134 but also the decrypting units 133a and 133b are provided on the reception apparatus side.

Furthermore, a storage unit 15 stores and reproduces the synthesized data S18 from the reception modem 131. The recording medium may be magnetic tape or floppy disks, for example. Use of another storage unit enables the synthesized data S18 to be edited.

Figure 4:
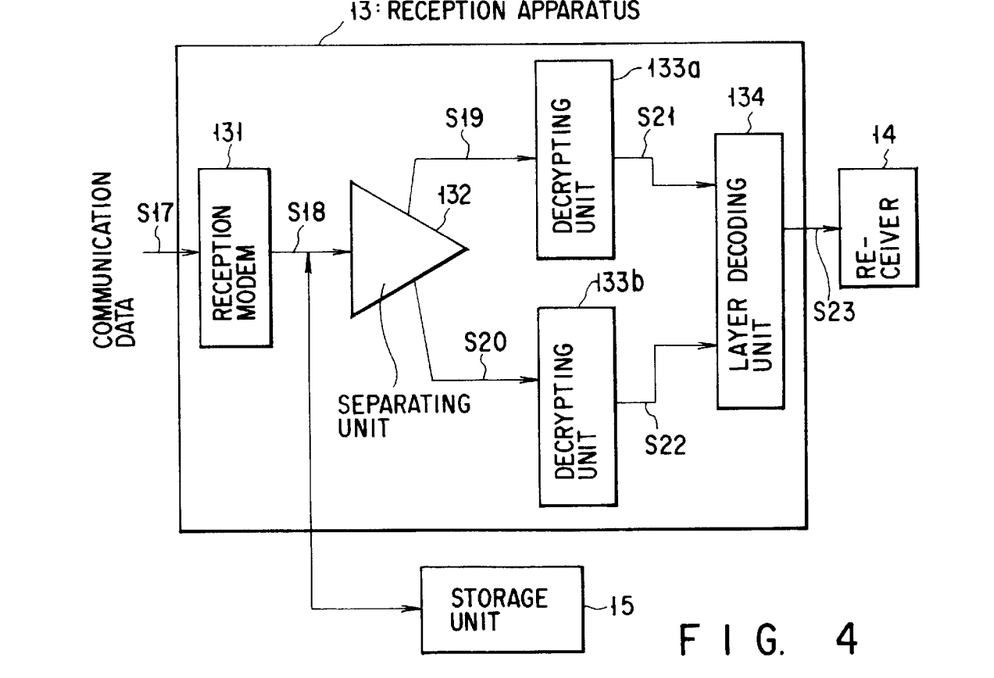
FIG. 4 is a block diagram of a second embodiment of a reception apparatus according to the present invention.

Use of a recording medium on which the synthesized data S18 has been recorded enables data exchange with a third party (i.e., a person under contract with the sender) having a reception apparatus of the same configuration as FIG. 4. If the reception apparatus of the third party has the decrypting unit 133a and the layer decoding unit 134, the third party can view at least the images of low-quality layer data. Therefore, viewing cannot be done without permission and if copying is effected without permission, what has been copied will be useless, with the result that copying without permission can be prevented.

Additionally, when the image of the synthesized data S18 recorded or that of the synthesized data S18 received from a third party is reproduced, the synthesized data S18 is reproduced from the storage unit 15 and is supplied to the separating unit 132. The data passes through the aforementioned processes and reaches the receiver 14, which displays images.

While in the embodiment, an example of coding in two layers has been explained, the layer coding unit 121 may divide the video signal S1 into m layers and code the individual layers. Then, a secret level setting unit and an encrypting unit are provided for each quality layer data item. The secrete level is the lowest for the lowest-quality layer data item (the lowest resolution data item), becomes higher as the quality gets higher, and is the highest for the highest-quality layer data item (the highest resolution data item). Accordingly, m decrypting units are provided in the reception apparatus.

Figure 5:
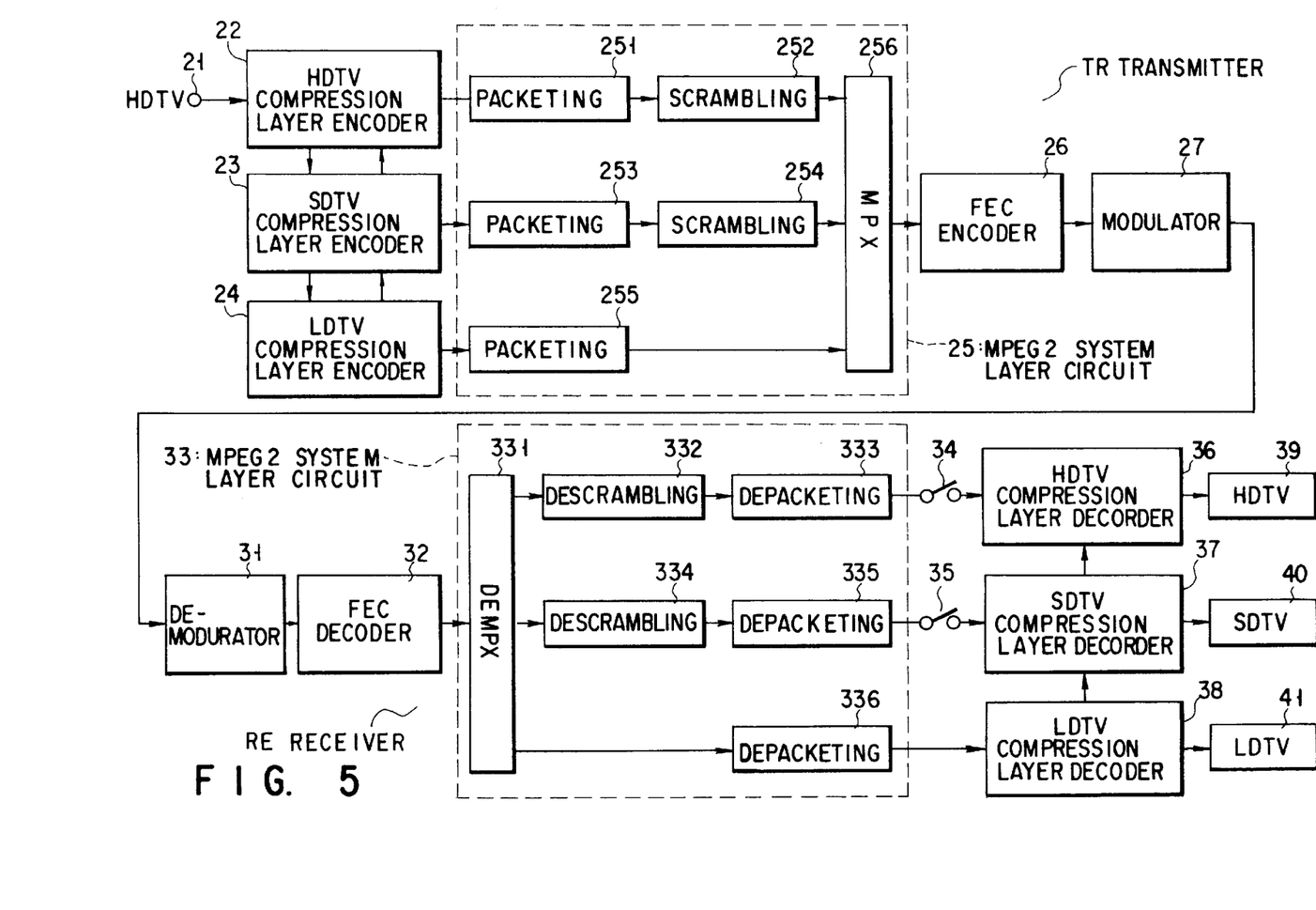
FIG. 5 is a circuit block diagram of a first embodiment of a digital television broadcasting system according to the present invention.

FIG. 5 is a block diagram showing the overall configuration of a digital television broadcasting system according to the present invention. In the figure, TR indicates a transmitter and RE indicates a receiver.

In the transmitter RT, a digital video signal (hereinafter, referred to as an HDTV signal) of the HDTV (High Definition TV) scheme is supplied to an input terminal 21. The signal is inputted to an HDTV compression layer encoder (hereinafter, just referred to as an HDTV encoder) 22.

Figure 6:
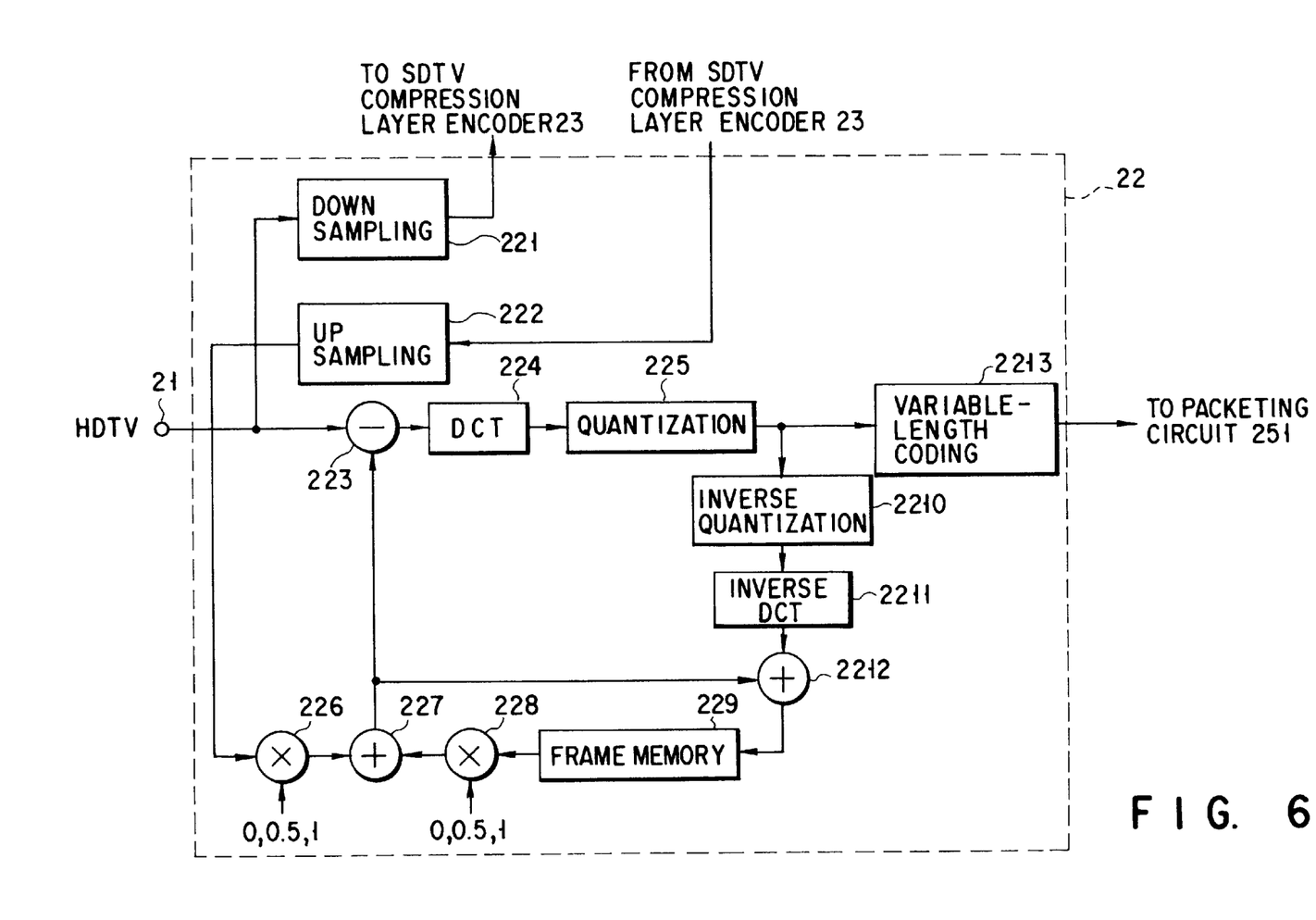
FIG. 6 is a circuit block diagram showing a concrete configuration of an HDTV compression layer encoder that performs a spatial layering process in the embodiment of FIG. 5.

FIG. 6 illustrates a concrete configuration of the HDTV encoder 22. The configuration is a spatial layering model shown in ISO/IEC 13818-2.

The inputted HDTV signal undergoes a ½ down sampling process at a down sampling circuit 221 and is sent to an SDTV (Standard Definition TV) compression layer encoder (hereinafter, just referred to an SDTV encoder) 23, which will be explained later. The down-sampled signal is also sent to a subtracter 223, which computes the difference between the input signal and the video signal of the preceding frame. The computation result undergoes DCT transform at a DCT circuit 224 and then the DCT-transformed signal is quantized at a quantization circuit 2225. The quantized video signal is subjected to variable-length coding at a variable-length coding circuit 2213 and the coded signal is sent to a packeting circuit 251 in an MPEG2 system layer circuit 25 explained later.

The video signal quantized at the quantization circuit 225 is inverse-quantized at an inverse quantization circuit 2210 and is then subjected to inverse DCT transform at an inverse DCT circuit 2211. Thereafter, the converted signal is added to the video signal of the preceding frame. The addition result is delayed for one frame at a frame memory 229 and then is multiplied by a specific coefficient at a multiplier 228. The result is supplied to an adder 227.

On the other hand, the video signal subjected to the compression process at the SDTV encoder 23 (hereinafter, referred to as an SDTV compression signal) is supplied to the HDTV encoder 22. The SDTV compressed signal is subjected to a twice up sampling process at an up sampling circuit 222 and then is multiplied by a specific coefficient at a multiplier 226. The result is supplied to the adder 227. The addition result from the adder 227 is sent as the video signal of the preceding frame to the subtracter 223 and the adder 2212.

The coefficients given to the multipliers 226 and 228 are set so that they may total to 1 and the output of the subtracter 223 become the smallest. In this way, spatial layering is effected.

Figure 7:
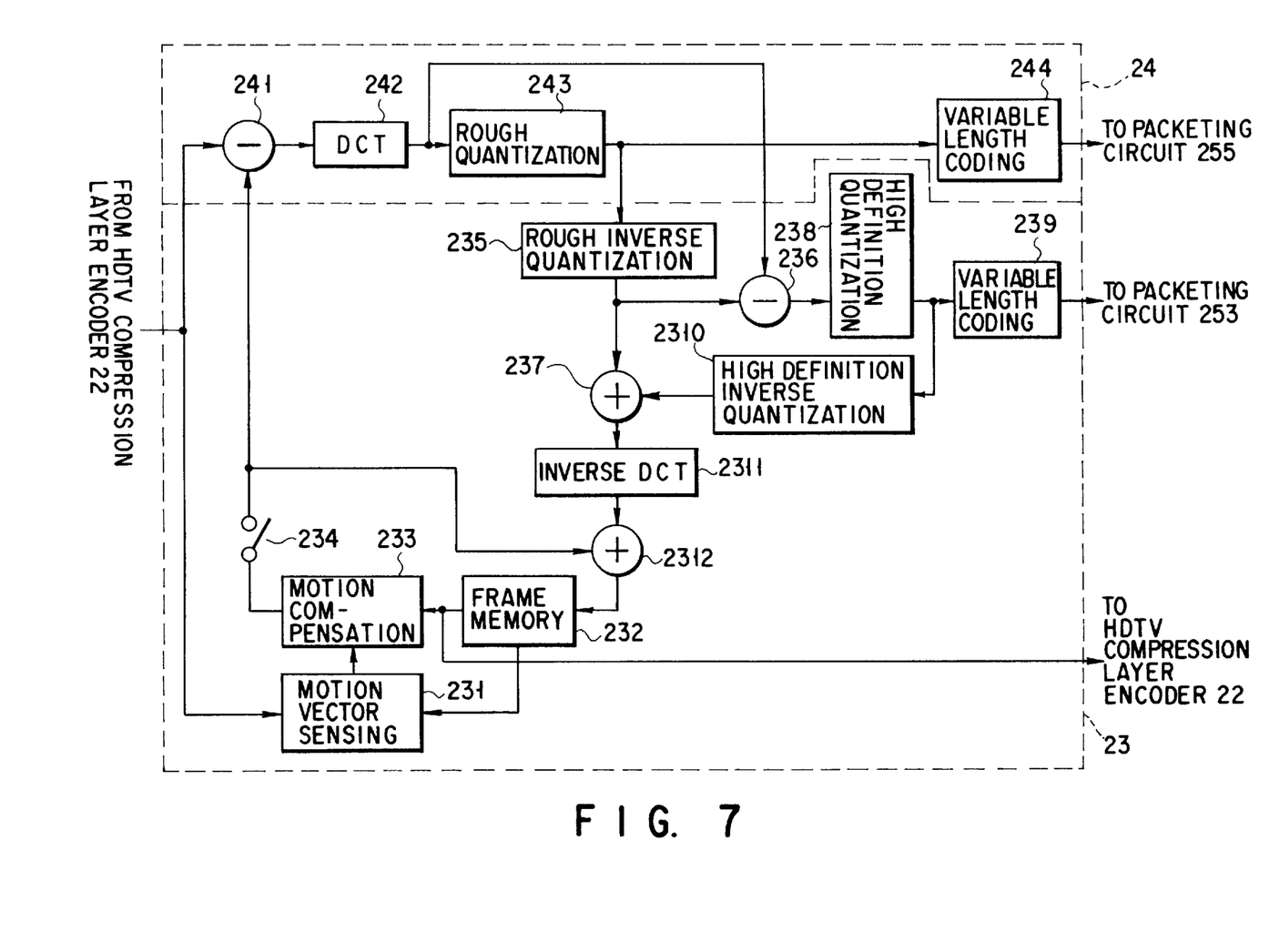
FIG. 7 is a block diagram showing a concrete configuration of an SDTV and LDTV compression layer encoder that performs an SNR layering process in the embodiment of FIG. 5.

Next, low level layers will be explained by reference to FIG. 7. FIG. 7 shows an SNR layering model determined in ISO/IEC 13818-2, which corresponds to the aforementioned SDTV encoder 23 and LDTV (Low Definition TV) compression layer encoder (hereinafter, just referred to as an LDTV encoder) 24.

In FIG. 7, the SDTV signal from the HDTV encoder 22 is inputted to a motion vector sensing circuit 231 of the SDTV encoder 23 and a subtracter 241 of the LDTV encoder 24.

In the SDTV encoder 23, the motion vector sensing circuit 231 also receives the video signal delayed for one frame at a frame memory 232 to sense the motion vector and sends the sensed motion vector signal to a motion compensation circuit 233. The motion compensation circuit 233 simultaneously receives the one-frame-delayed video signal from the frame memory 232 and makes motion compensation according to the sensed motion vector signal.

The motion-compensated video signal is sent via a switch circuit 234 to the subtracter 241 in the LDTV encoder 24. The switch circuit 234 is normally set in an on state. When the SDTV signal from the HDTV encoder 22 indicates intraframe coding, the switch circuit is brought into an off state.

In the LDTV encoder 24, the subtracter 241 computes the difference between the present SDTV signal from the HDTV encoder 22 and the motion-compensated video signal of the preceding frame from the SDTV encoder 23 (in the case of intraframe coding, the present SDTV signal is outputted without any modification).

After the difference value has undergone DCT transform at a DCT circuit 242, the result is roughly quantized at a rough quantization circuit 243 and is variable-length-coded at a variable-length coding circuit 244, which outputs the coded signal as an LDTV compression signal to a packeting circuit 253 in the MPEG2 system layer circuit 25. The output of the rough quantization circuit 243 is also supplied to the SDTV encoder 23.

In the SDTV encoder 23, a rough inverse quantization circuit 235 performs rough inverse quantization of the roughly quantized signal from the LDTV encoder 24 and supplies its output to a subtracter 236 and an adder 237.

The subtracter 236 extracts only high-definition information by subtracting the roughly inverse-quantized signal from the rough inverse quantization circuit 235 from the present signal from the DCT 242 containing high-definition information before rough quantization. The thus obtained high-definition signal is quantized at a high-definition quantization circuit 238 and is variable-length coded at a variable-length coding circuit 239, which sends the coded signal as a SDTV compression signal to a packeting circuit 252 in the MPEG2 system layer circuit 25.

The output of the high-definition quantization circuit 238 is inverse-quantized at a high-definition inverse quantization circuit 2310 and sent to an adder 237. The adder 237 adds the rough inverse quantization signal from the rough inverse quantization circuit 235 to the high-definition inverse quantization signal from the high-definition inverse quantization circuit 2310. The addition result is subjected to inverse DCT transform at an inverse DCT circuit 2311 and the result is inputted to an adder 2312.

The adder 2312 adds the motion-compensated video signal of the preceding frame to the inverse DCT-transformed output, when the switch circuit 234 is on (when the video signal of the preceding frame is in a state other than intraframe coding). The addition output is inputted to the frame memory 232. The frame memory 232 delays the input video signal for one frame. As described earlier, the output of the frame memory 232 is supplied to the motion vector sensing circuit 231 and motion compensation circuit 233 as well as to the HDTV encoder 22.

The outputs of the HDTV, SDTV, and LDTV encoders constructed as described above are packeted at the packeting circuits 251, 253, and 255 in the MPEG2 system layer circuit 25, respectively. Each of the packeting circuits 251, 253, and 255 assigns a packet ID (Identifier) to the packet signal to distinguish the signal from others.

After the HDTV packet signal and SDTV packet signal from the packeting circuits 251 and 253 have been scrambled at scrambling circuits 252 and 254 respectively, the scrambled signals, together with the LDTV packet signal (not subjected to scrambling) from the packeting circuit 255, are multiplexed in time at a multiplexing circuit (MPX) 256, which effects SNR (signal-to-noise ratio) layer coding of these signals. The multiplexed output is supplied as an MPEG2 system layer processing output to an FEC (Forward Error Correction) encoder 26, which performs an FEC process on the supplied signal. The resulting signal is supplied to a modulator 27, which modulates the signal and produces the broadcasting output.

Then, when the receiver RE receives the transmission signal from the transmitter TR, the received signal is demodulated at a modulation circuit 31. The modulated signal undergoes an FEC decode process at an FEC decoder 32. The resulting signal is inputted to an MPEG2 system layer circuit 33.

In the MPEG2 system layer circuit 33, a demultiplexing circuit (DEMAX) 331 demultiplexes the inputted time-division multiplexing signal on the basis of the packet IDs assigned at the transmission side. After the HDTV packet signal and SDTV packet signal separated here (the high-band signals subjected to SNR layer coding (the low-level layer signals in space layering)) have been descrambled at descrambling circuits 332 and 334, the resulting signals are restored to an HDTV compression signal and SDTV compression signal at a depacketing circuit 333. These HDTV compression signal and SDTV compression signal are sent via switch circuits 34 and 35 to an HDTV compression layer decoder (hereinafter, just referred to as an HDTV decoder) 36 and an SDTV compression layer decoder (hereinafter, just referred to as an SDTV decoder) 37, respectively.

The switch circuits 34 and 35 are turned on, only when the reception of the HDTV signal and SDTV signal is permitted.

The LDTV packet signal (the SNR-layer-coded low-band signal (the high layer signal in space layering)) is inputted directly to a depacketing circuit 336, which performs a depacketing process on the LDTV compression signal. The LDTV compression signal is sent to an LDTV compression layer decoder (hereinafter, just referred to as an LDTV decoder) 38.

Figure 8:
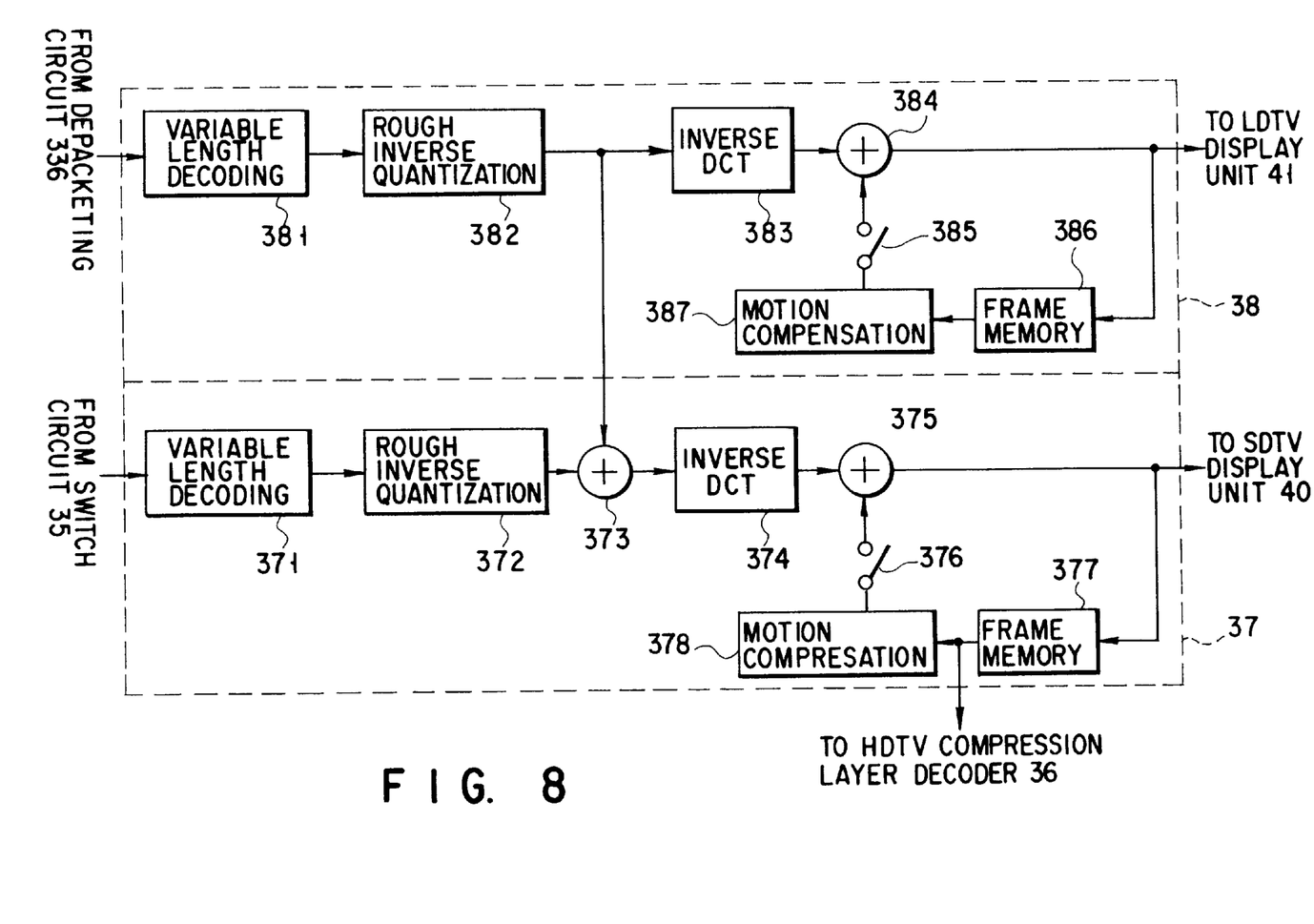
FIG. 8 is a block diagram showing a concrete configuration of an SDTV and LDTV compression layer decoder that performs an SNR layering process in the embodiment of FIG. 5.
Figure 9:
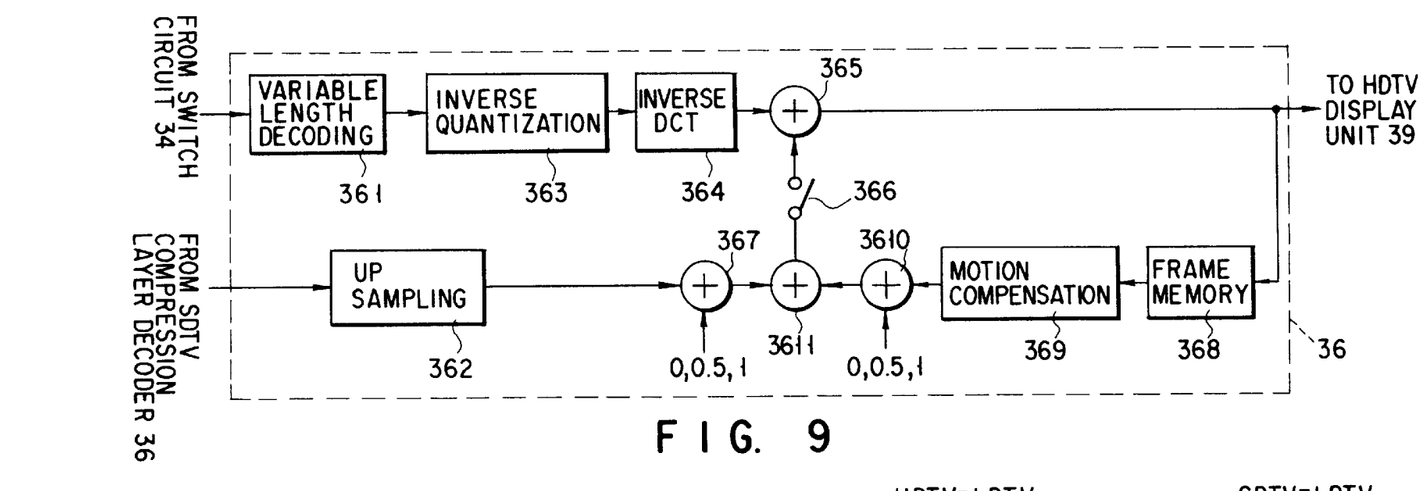
FIG. 9 is a block diagram showing a concrete configuration of an HDTV compression layer decoder that performs a spatial layering process in the embodiment of FIG. 5.

The compression signals of the individual layers thus obtained are inputted to the decoders 36, 37, and 38 corresponding to the respective layers. FIGS. 8 and 9 show a concrete configuration of the decoder of each layer.

FIG. 8 shows a concrete configuration of the portion corresponding to the LDTV decoder 38 and SDTV decoder 37 of FIG. 5. Referring to FIG. 8, SNR layer decoding will be explained.

In the LDTV decoder 38, the LDTV compression signal (the low-band component of the space layering signal) from the depacketing circuit 336 is inputted to a variable-length decoding circuit 381, which decodes the input. The decoded signal is supplied to a rough inverse quantization circuit 382, which performs rough inverse quantization. The output of the inverse quantization circuit 382 is inputted to an inverse DCT circuit 383 as well as to an adder 373 of the SDTV decoder 37.

The inverse DCT circuit 383 performs inverse DCT transform according to the coefficient obtained from inverse quantization. The output of the transform is added to the signal of the preceding frame at an adder 384, which thereby restores it to the original LDTV signal. The LDTV signal is inputted to a frame memory 386, which performs a one-frame delay process. The output of the frame memory 386 is subjected to motion compensation at a motion compensation circuit 387 according to a motion compensation signal (not shown). The compensated signal is inputted via a switch circuit 385 to the adder 384.

The switch circuit 385 is normally set in an on state. When the output signal from the inverse DCT circuit 383 is a intraframe coding signal, the switch circuit is brought into an off state to prevent the signal from the motion compensation circuit 387 from being supplied to the adder 384.

The LDTV signal decoded as described above is outputted from the adder 384 to an LDTV display unit 41. Although not illustrated in detail, a horizontal pixel curtailing circuit performs a pixel curtailing process on the LDTV signal and a vertical line curtailing circuit performs a line curtailing process on the LDTV signal. Then, the unnecessary horizontal and vertical high-band components are eliminated by a horizontal and vertical filters and thereafter, representation with SIF resolution (about half of the horizontal and vertical of R601) is allowed to appear on the display.

Next, the configuration of the SDTV decoder 37 will be described.

When descrambling is permitted and the switch circuit 35 is set in an on state, the SDTV compression signal (the high-band component of the space layering signal) obtained at a depacketing circuit 335 is inputted to the SDTV decoder 37. After a variable-length decoding circuit 371 in the SDTV decoder has decoded the compression signal, a high-definition inverse quantization circuit 372 performs an inverse quantization process on the decoded signal. The resulting signal is inputted to an adder 373, which adds it to the rough quantization signal obtained at the LDTV decoder 38.

At this time, when the switch circuit 35 is brought into an off state and the SDTV compression signal cannot be obtained, the output of the adder 373 contains only the output of the rough inverse quantization circuit 382 and makes a signal containing only the low-band components.

The output of the adder 373 thus obtained is subjected to inverse DCT transform at an inverse DCT circuit 374 and then the transformed signal is added to the signal of the preceding frame at an adder 375, which thereby restores it to the original SDTV signal. The SDTV signal is inputted to a frame memory 377, which performs an one-frame delay process. The output of the frame memory 377 undergoes motion compensation at a motion compensation circuit 378 according to a motion compensation signal (not shown). The compensated signal is inputted via a switch circuit 376 to an adder 374.

The switch circuit 376 is normally set in an on state. When the output signal from the inverse DCT circuit 383 is a intraframe coding signal, the switch circuit is brought into an off state to prevent the signal from the motion compensation circuit 378 from being supplied to the adder 376.

The SDTV signal decoded as described above is outputted from the adder 375 to an SDTV display unit 40, which provides representation of R601 level. When descrambling is not permitted, only the low-band signal in SNR layering is outputted to the display unit 40.

The output of the frame memory 377 is outputted to the HDTV decoder 36. When descrambling is not permitted, only the low-band signal in SNR layering is outputted to the HDTV decoder 36.

Next, the configuration of the HDTV decoder 36 will be explained by reference to FIG. 9.

When descrambling is permitted and the switch circuit 34 is set in an on state, the HDTV compression signal (the high-band component of the space layering signal) obtained at a depacketing circuit 333 is inputted to the HDTV decoder 36 and is decoded at a variable-length decoding circuit 361. The decoded signal undergoes an inverse quantization process at an inverse quantization circuit 363 and is subjected to an inverse DCT process at an inverse DCT circuit 364. Thereafter, the resulting signal is inputted to an adder 365, which adds it to the video signal of the preceding frame inputted via a switch circuit 366.

The video signal of the preceding frame is obtained as follows. The signal sent from the frame memory 377 in the SDTV decoder 37 is subjected to a twice up sampling process at an up sample circuit 362. Then, the up sampled signal is multiplied by a coefficient sent from the transmission side at a multiplier 367. On the other hand, the output of the adder 365 is delayed for one frame at a frame memory 368. The delayed output is subjected to motion compensation at a motion compensation circuit 369 on the basis of the motion vector signal sent from the transmission side. The compensated signal is multiplied by a coefficient sent from the transmission side at a multiplier 3610. Then, the video signal of the preceding frame is produced by adding the output of the multiplier 367 to that of the multiplier 3610.

The switch circuit 366 is normally set in an on state. When the output signal from the inverse DCT circuit 364 is a intraframe coding signal, the switch circuit is brought into an off state to cut off the supply of the signal to the adder 365.

The HDTV signal thus obtained (the signal about twice the horizontal and vertical of R601) is outputted to an HDTV display unit 39, which displays the signal. At this time, when descrambling is not permitted at the descrambling circuit 332 and no signal is supplied from the switch circuit 34, the resolution of the HDTV display unit 39 is on the order of R601 at best. When descrambling is not permitted at the descrambling circuit 334 and no signal is supplied from the switch circuit 35, the resolution of the HDTV display unit 39 is on the order of SIF (the resolution about half of the horizontal and vertical of R601).

With the digital television broadcasting system constructed as described above, on the transmission side, the high layer encoded signals (HDTV, SDTV) are scrambled and the low layer encoded signals (LDTV) are not scrambled. On the reception side, a descrambling process is selectively performed in a high layer signal decoding process to enable the signals to be displayed, whereas in a low layer signal decoding process, the signals can be displayed without a descrambling process.

In MPEG, a layer called a system layer is provided as a layer for multiplexing the compression layers. A charging flag is provided for the system layer. Scrambling can be controlled by using the flag. When this approach is used directly, however, reproduction of the scrambled signal will cause totally illegible images to appear on the screen.

To overcome this problem, with the present invention, normal images are allowed to be reproduced from the low layer data and be displayed on the reception side by a method that scrambles only the high layers of layered images and does not scramble the low layers in the system layer protocol. The images actually have no bandwidth and are barely understandable.

Therefore, with an HDTV display unit 39 for which the descrambling of the high layer signals in space layering and the high layer signals in SNR layering has not been permitted (under no contract with the sender for fees), only the images whose contents are barely understandable and which has a very low resolution, can be recognized free of charge. When descrambling has not permitted for only the high layer signals in space layering and the signals are not supplied, images with a resolution of the order of R601 will be obtained.

Furthermore, in the case of a receiver capable of decoding all of the layers as an application, because the decoding of each compression layer must be effected as shown in FIG. 5, the video signal of each level can be displayed.

Figure 10A:
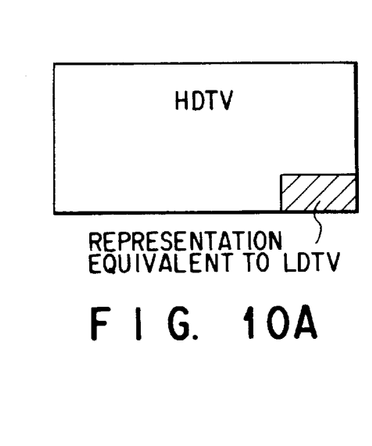
FIGS. 10A to 10D each illustrate an example of display in the embodiment of FIG. 5.
Figure 10B:
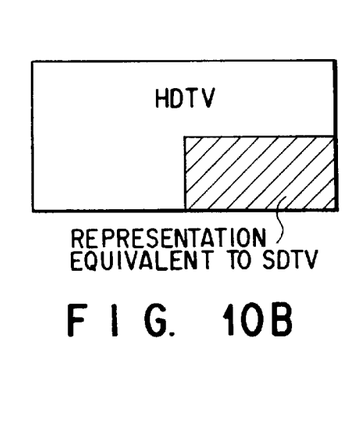

Accordingly, by the display process in the LDTV, a screen that is not scrambled can be displayed in the size about 1/16 of the HDTV screen as shown in FIG. 10A. Similarly, when SDTV scrambling is permitted and can be done, a screen that is of the size about 1/4 of the HDTV screen and has a resolution of the order of R601 can be displayed as shown in FIG. 10B.

Figure 10C:
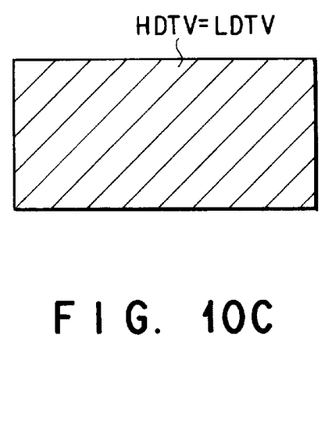
Figure 10D:
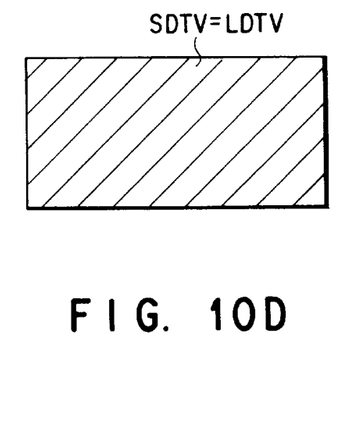

Furthermore, as shown in FIG. 10C, a picture equivalent to LCTV can be enlarged and displayed on the HDTV entire screen (is allowed to fill the entire screen). In addition, as shown in FIG. 10D, a picture equivalent to LCTV can be enlarged and displayed on the SDTV entire screen (is allowed to fill the entire screen). Similarly, a picture equivalent to SDTV can be enlarged and displayed on the HDTV entire screen (is allowed to fill the entire screen).

It goes without saying that the layer coding process on the transmitter TR side is not limited to those in the above embodiments, but may be achieved in other methods.

With the present invention, the layer data set by the sender can be viewed and listened to by only the privileged viewers under contract with the sender, which helps protect copyrights. Additionally, the receivers can record, edit, and exchange the contents of communications with a third party.

Furthermore, with the present invention, even when a scrambled program is selected and decoded without descrambling, it is possible to provide a digital television broadcasting system which enables the program to be viewed to the extent that the contents of the program can be understood.

We claim:

1. A transmission apparatus comprising:

layer coding means for converting an image signal into a frequency domain signal by discrete cosine transform (DCT), dividing the frequency domain signal into m (m is an integer not less than 2) layers in terms of frequency to generate m layer signals, and coding each of the layer signals;

encrypting means provided in correspondence to each of (m−1) layer signals of the layer signals obtained by the layer coding means in a frequency domain except for the lowest layer signal, for encrypting the (m−1) layer signals; and multiplexing means for multiplexing the lowest layer signal in the frequency domain and the (m−1) layer signals encrypted by the corresponding encrypting means and outputting a resultant signal as a transmission signal.

2. A reception apparatus comprising:

separating means that receives a signal that is generated by converting an image signal into a frequency domain signal by discrete cosine transform (DCT), dividing the frequency domain signal into m (m is an integer not less than 2) layers in terms of frequency to generate m layer signals, coding each of the layer signals, encrypting (m−1) layer signals obtained by the layer coding means excluding the lowest layer signal in a frequency domain and multiplexing the lowest layer signal and the (m−1) layer signals encrypted by the encrypting means, said separating means being used for separating the received signal into the lowest layer signal in the frequency domain and the encrypted (m−1) layer signals;

decrypting means provided in correspondence to each of the encrypted (m−1) layer signals for decrypting an encrypted layer signal that is separated from the lowest layer signal by the separating means;

layer decoding means provided in correspondence to each of the m layer signals for decoding each of the (m−1) layer signals decrypted by the corresponding decrypting means and the lowest layer signal separated by the separating means; and inverse discrete cosine transforming means for selecting layer signals corresponding in number to a designated resolution from among the lowest layer signal and the (m−1) layer signals in higher layers, all individually decoded by the corresponding layer decoding means, the layer signals being selected from the frequency domain in ascending order starting from the lowest layer signal, and said inverse discrete cosine transforming means being further used for combining the selected layer signals and inverse discrete cosine transforming a resultant signal to generate an image signal which realizes the designated resolution.

3. A communication processing system comprising:

a transmission apparatus; and a reception apparatus, said transmission apparatus having:

layer coding means for converting an image signal into a frequency domain signal by discrete cosine transform (DCT), dividing the frequency domain signal into m (m is an integer not less than 2) layers in terms of frequency to generate m layer signals, and coding each of the layer signals;

encrypting means provided in correspondence to each of (m−1) layer signals of the layer signals obtained by the layer coding means in a frequency domain except for the lowest layer signal, for encrypting the (m−1) layer signals; and multiplexing means for multiplexing the lowest layer signal in the frequency domain and the (m−1) layer signals encrypted by the corresponding encrypting means and outputting a resultant signal as a transmission signal, and said reception apparatus having:

separating means for receiving the transmission signal output from the transmission apparatus and separating the received signal into the lowest layer signal in the frequency domain and the encrypted (m−1) layer signals;

decrypting means provided in correspondence to each of the encrypted (m−1) layer signals for decrypting an encrypted layer signal that is separated from the lowest layer signal by the separating means;

layer decoding means provided in correspondence to each of the m layer signals for decoding each of the (m−1) layer signals decrypted by the corresponding decrypting means and the lowest layer signal separated by the separating means; and inverse discrete cosine transforming means for selecting layer signals corresponding in number to a designated resolution from among the lowest layer signal and the (m−1) layer signals in higher layers, all individually decoded by the corresponding layer decoding means, the layer signals being selected from the frequency domain in ascending order starting from the lowest layer signal, and said inverse discrete cosine transforming means being further used for combining the selected layer signals and inverse discrete cosine transforming a resultant signal to generate an image signal which realizes the designated resolution.

4. A transmission apparatus comprising:

layer coding means for converting an image signal into a frequency domain signal by discrete cosine transform (DCT), dividing the frequency domain signal into m (m is an integer not less than 3) layers in terms of frequency to generate m layer signals, and coding each of the layer signals;

encrypting means provided in correspondence to each of e (e is an integer not less than 2, m>e) of the layer signals obtained by the layer coding means for encrypting the e layer signals, the e layer signals being selected in descending order starting from the highest one in a frequency domain; and multiplexing means for multiplexing remaining (m−e) layer signals including the lowest ones that are coded by the layer coding means and the e layer signals encrypted by the corresponding encrypting means and outputting a resultant signal as a transmission signal.

5. A reception apparatus comprising:

separating means that receives a signal that is generated by converting an image signal into a frequency domain signal by discrete cosine transform (DCT), dividing the frequency domain signal into m (m is an integer not less than 3) layers in terms of frequency to generate m layer signals, coding each of the layer signals, encrypting e (e is an integer not less than 2) of the layer signals obtained by the layer coding means, the e layer signals being selected from a frequency domain in descending order starting from the highest one, and multiplexing remaining (m−e) layer signals including the lowest one that are coded by the layer coding means and the e layer signals encrypted by the encrypting means, said separating means being used for separating the received signal into the e layer signals including the highest one that are encrypted and the remaining (m−e) layer signals including the lowest one in the frequency domain;

decrypting means provided in correspondence to each of the encrypted e layer signals for decrypting an encrypted layer signal separated by the separating means;

layer decoding means provided in correspondence to each of the m layer signals for decoding each of the e layer signals including the highest one that are decrypted by the corresponding decrypting means and the remaining (m−e) layer signals including the lowest one and separated by the separating means; and inverse discrete cosine transforming means for selecting layer signals corresponding in number to a designated resolution from among the e layer signals including the highest one and the remaining (m−e) layer signals including the lowest one, all individually decoded by the corresponding layer decoding means, the layer signals being selected from the frequency domain in an ascending order starting from the lowest one, and said inverse discrete cosine transforming means being further used for combining the selected layer signals and inverse discrete cosine transforming a resultant signal to generate an image signal which realizes the designated resolution.

6. A communication processing system comprising:

a transmission apparatus; and a reception apparatus, said transmission apparatus having:

layer coding means for converting an image signal into a frequency domain signal by discrete cosine transform (DCT), dividing the frequency domain signal into m (m is an integer not less than 3) layers in terms of frequency to generate m layer signals, and coding each of the layer signals;

encrypting means provided in correspondence to each of e (e is an integer not less than 2, m>e) of the layer signals obtained by the layer coding means for encrypting the e layer signals, the e layer signals being selected in descending order starting from the highest one in a frequency domain; and multiplexing means for multiplexing remaining (m−e) layer signals including the lowest ones that are coded by the layer coding means and the e layer signals encrypted by the corresponding encrypting means and outputting a resultant signal as a transmission signal, and said receptions apparatus having:

separating means for receiving the transmission signal from the transmission apparatus and separating the received signal into the e layer signals including the highest one that are encrypted and the remaining (m−e) layer signals including the lowest one in the frequency domain;

decrypting means provided in correspondence to each of the encrypted e layer signals for decrypting an encrypted layer signal separated by the separating means;

layer decoding means provided in correspondence to each of the m layer signals for decoding each of the e layer signals including the highest ones that are decrypted by the corresponding decrypting means and the remaining (m−e) layer signals including the lowest one and separated by the separating means; and inverse discrete cosine transforming means for selecting layer signals corresponding in number to a designated resolution from among the e layer signals including the highest one and the remaining (m−e) layer signals including the lowest one, all individually decoded by the corresponding layer decoding means, the layer signals being selected from the frequency domain in an ascending order starting from the lowest one, and said inverse discrete cosine transforming means being further used for combining the selected layer signals and inverse discrete cosine transforming a resultant signal to generate an image signal which realizes the designated resolution.

7. A transmission apparatus comprising:

layer coding means for converting an image signal into a frequency domain signal by discrete cosine transform (DCT), dividing the frequency domain signal into m (m is an integer not less than 2) layers in terms of frequency to generate m layer signals, and coding each of the layer signals;

secret level setting means provided in correspondence to each of the m layer signals generated by the layer coding means for generating an individual secret level setting signal;

encrypting means provided in correspondence to each of the m layer signals generated by the layer coding means for encrypting an individual layer signal in accordance with a secret level that is determined by a corresponding secret level setting signal output from the corresponding secret level setting means; and multiplexing means for multiplexing the m layer signals each encrypted by the corresponding encrypting means and outputting a resultant signal as a transmission signal.

8. A transmission apparatus according to claim 7, characterized in that said secret level setting means provided in correspondence to each of the m layer signals sends the secret level setting signal to the corresponding encrypting means in a manner that the encrypting means corresponding to the highest layer signal in the frequency domain performs encryption at the highest secret level among the encrypting means for all the layer signals.

9. A transmission apparatus according to claim 7, characterized in that said secret level setting means provided in correspondence to each of the m layer signals sends the secret level setting signal to the corresponding encrypting means in a manner that the secret level at which the encrypting means performs encryption on each layer signal increases in order of ascending frequency level in the frequency domain.

10. A transmission apparatus according to claim 7, characterized in that said secret level setting means provided in correspondence to each of the m layer signals sends the secret level setting signal to the corresponding encrypting means in a manner that the encrypting means corresponding to the lowest layer signal in the frequency domain performs encryption at the lowest secret level among the encrypting means for all the layer signals.

11. A transmission apparatus according to claim 7, characterized in that said secret level setting means provided in correspondence to each of the m layer signals sends the secret level setting signal to the corresponding encrypting means in a manner that the secret level at which the encrypting means performs encryption on each layer signal decreases in order of descending frequency level in the frequency domain.

12. A reception apparatus comprising:

separating means that receives a multiplexed signal that is generated by converting an image signal into a frequency domain signal by discrete cosine transform (DCT), dividing the frequency domain signal into m (m is an integer not less than 2) layers in terms of frequency to generate m layer signals, coding each of the layer signals, encrypting each of the layer signals obtained by the layer coding means in accordance with a secret level that is arbitrarily determined for each of the layer signals, and multiplexing the encrypted layer signals, said separating means being used for separating the received signal into the encrypted m layer signals;

decrypting means provided in correspondence to each of the encrypted m layer signals for decrypting an individual encrypted layer signal that is separated, in accordance with the corresponding secret level;

layer decoding means provided in correspondence to each of the m layer signals for decoding each of the m layer signals decrypted by the corresponding decrypting means; and inverse discrete cosine transforming means for selecting layer signals corresponding in number to a designated resolution from among the m layer signals, all individually decoded by the corresponding layer decoding means, the layer signals being selected from the frequency domain in ascending order starting from the lowest layer, and said inverse discrete cosine transforming means being further used for combining the selected layer signals and inverse discrete cosine transforming a resultant signal to generate an image signal which realizes the designated resolution.

13. A reception apparatus according to claim 12, further comprising storage means connected to an input terminal of the separating means and used for recording and reproducing the multiplexed signal.

14. A communication processing system comprising:

a transmission apparatus; and a reception apparatus, said transmission apparatus having:

layer coding means for converting an image signal into a frequency domain signal by discrete cosine transform (DCT), dividing the frequency domain signal into m (m is an integer not less than 2) layers in terms of frequency to generate m layer signals, and coding each of the layer signals;

secret level setting means provided in correspondence to each of the m layer signals generated by the layer coding means for generating an individual secret level setting signal;

encrypting means provided in correspondence to each of the m layer signals generated by the layer coding means for encrypting an individual layer signal in accordance with a secret level that is determined by a corresponding secret level setting signal output from the corresponding secret level setting means; and multiplexing means for multiplexing the m layer signals each encrypted by the corresponding encrypting means and outputting a resultant signal as a transmission signal, and said reception apparatus having:
- separating means for receiving the transmission signal and separating the received signal into the encrypted m layer signals;
- decrypting means provided in correspondence to each of the encrypted m layer signals for decrypting an individual encrypted layer signal that is separated, in accordance with the corresponding secret level;
- layer decoding means provided in correspondence to each of the m layer signals for decoding each of the m layer signals decrypted by the corresponding decrypting means; and
- inverse discrete cosine transforming means for selecting layer signals corresponding in number to a designated resolution from among the m layer signals, all individually decoded by the corresponding layer decoding means, the layer signals being selected from the frequency domain in ascending order starting from the lowest layer, and said inverse discrete cosine transforming means being further used for combining the selected layer signals and inverse discrete cosine transforming a resultant signal to generate an image signal which realizes the designated resolution.

15. A communication processing system according to claim 14, characterized in that said secret level setting means, which is provided in the transmission apparatus in correspondence to each of the m layer signals, sends the secret level setting signal to the corresponding encrypting means in a manner that the encrypting means corresponding to the highest layer signal in the frequency domain performs encryption at the highest secret level among the encrypting means for all the layer signals.

16. A communication processing system according to claim 14, characterized in that said secret level setting means, which is provided in the transmission apparatus in correspondence to each of the m layer signals, sends the secret level setting signal to the corresponding encrypting means in a manner that the secret level at which the encrypting means performs encryption on each layer signal increases in order of ascending frequency level in the frequency domain.

17. A communication processing system according to claim 14, characterized in that said secret level setting means, which is provided in the transmission apparatus in correspondence to each of the m layer signals, sends the secret level setting signal to the corresponding encrypting means in a manner that the encrypting means corresponding to the lowest layer signal in the frequency domain performs encryption at the lowest secret level among the encrypting means for all the layer signals.

18. A communication processing system according to claim 14, characterized in that said secret level setting means, which is in the transmission apparatus provided in correspondence to each of the m layer signals, sends the secret level setting signal to the corresponding encrypting means in a manner that the secret level at which the encrypting means performs encryption on each layer signal decreases in order of descending frequency level in the frequency domain.

19. A digital television broadcasting system in which a broadcast signal is transmitted and received, said broadcast signal being generated by converting a television signal into a frequency domain signal by discrete cosine transform (DCT), dividing the frequency domain signal into m (m is an integer not less than 2) layers in terms of frequency to generate m encoded signals, and multiplexing the coded signals, said digital television broadcasting system comprising:
- a transmission apparatus for transmitting said broadcast signal; and
- a plurality of unspecified reception apparatuses for each receiving said broadcast signal, wherein the transmission apparatus performs a scrambling process onto e (e is a natural number, m>e) encoded signals that are selected from the m encoded signals in descending order starting from the highest-frequency signal, and multiplexes the scrambled signals and remaining (m−e) encoded signals including the lowest-frequency signal into the broadcast signal, and
- each of the reception apparatuses extracts from the broadcast signal the e encoded signals including the highest-frequency signal and subjected to the scrambling process, performs a descrambling process onto the extracted signals, decodes the descrambled signals and the (m−e) remaining encoded signals including the lowest-frequency signal and unscrambled, combines decoded signals selected from among the decoded signals in ascending order starting from the lowest-frequency signal in the frequency domain in such a manner as to correspond in number to a designated resolution, and generates a television signal which realizes the designated resolution.

20. A transmission apparatus used in a digital television broadcasting system in which a broadcast signal is transmitted and received, said broadcast signal being generated by converting a television signal into a frequency domain signal by discrete cosine transform (DCT), dividing the frequency domain signal into m (m is an integer not less than 2) layers in terms of frequency to generate m encoded signals, coding each of the encoded signals and multiplexing the coded signals, said transmission apparatus comprising scrambling means for performing a scrambling process onto e (e is a natural number, m>e) encoded signals selected from the m encoded signals in descending order starting from the highest-frequency signal, said transmission apparatus being characterized by coding and multiplexing the e encoded signals including the highest-frequency signal and subjected to the scrambling process by the scrambling means and the remaining (m−e) encoded signals including the lowest-frequency signal to generate the broadcast signal.

21. A reception apparatus used in a digital television broadcasting system in which a broadcast signal is transmitted and received, said broadcast signal being generated by converting a television signal into a frequency domain signal by discrete cosine transform (DCT), dividing the frequency domain signal into m (m is an integer not less than 2) layers in terms of frequency to generate m encoded signals, coding each of the encoded signals and multiplexing the coded signals, said broadcast signal being outputted from a transmission apparatus which performs a scrambling process onto e (e is a natural number, m>e) encoded signals selected from the m encoded signals in descending order starting from highest-frequency signal and codes and multiplexes the e encoded signals including the highest-frequency signal and subjected to the scrambling process and the remaining (m−e) encoded signals including the lowest-frequency signal to generate the broadcast signal, said reception apparatus comprising:
- separating means for separating the broadcast signal into the e encoded signals selected in descending order starting from the highest-frequency signal and subjected to the scrambling process and the remaining (m−e) encoded signals including the lowest-frequency signal and unscrambled;
- descrambling means for performing a descrambling process onto the e encoded signals separated by the separating means;
- decoding means for decoding each of the e encoded signals subjected to the descrambling process and the remaining (m−e) encoded signals; and
- television signal generating means for selecting decoded signals from among the m decoded signals in ascending order starting from the lowest-frequency signal in the frequency domain in such a manner as to correspond in number to a designated resolution, combining the selected signals and generating a television signal which realizes the designated resolution.

22. A transmission and reception method for a digital television broadcasting system in which a broadcast signal is transmitted and received, said broadcast signal being generated by converting a television signal into a frequency domain signal by discrete cosine transform (DCT), dividing the frequency domain signal into m (m is an integer not less than 2) layers in terms of frequency to generate m encoded signals, coding each of the encoded signals and multiplexing the coded signals, said transmission and reception method comprising:
- performing a scrambling process onto e (e is a natural number, m>e) of the encoded signals selected in descending order starting from the highest-frequency signal, and coding and multiplexing the e encoded signals including the highest-frequency signal and subjected to the scrambling process and the remaining (m−e) encoded signals including the lowest-frequency signal to generate the broadcast signal, on a transmission side; and
- extracting from the broadcast signal the e encoded signals including the highest-frequency signal and subjected to the scrambling process on the transmission side, performing a descrambling process onto the extracted signals, decoding the descrambled signals and the remaining (m−e) encoded signals including the lowest-frequency signal and unscrambled, combining decoded signals selected from among all the decoded signals in ascending order starting from the lowest-frequency signal in the frequency domain in such a manner as to correspond in number to a designated resolution, and generating a television signal which realizes the designated resolution.

23. A transmission method for a digital television broadcasting system in which a broadcast signal is transmitted and received, said broadcast signal being generated by converting a television signal into a frequency domain signal by discrete cosine transform (DCT), dividing the frequency domain signal into m (m is an integer not less than 2) layers in terms of frequency to generate m encoded signals, coding each of the encoded signals and multiplexing the coded signals, said transmission method comprising:
- performing a scrambling process onto e (e is a natural number, m>e) of the encoded signals selected in descending order starting from the highest-frequency signal, and coding and multiplexing the e encoded signals including the highest-frequency signal and subjected to the scrambling process and the remaining (m−e) encoded signals including the lowest-frequency signal to generate the broadcast signal.

24. A reception method for a digital television broadcasting system in which a broadcast signal is transmitted and received, said broadcast signal being generated by converting a television signal into a frequency domain signal by discrete cosine transform (DCT), dividing the frequency domain signal into m (m is an integer not less than 2) layers in terms of frequency to generate m encoded signals, coding each of the encoded signals and multiplexing the coded signals, wherein, on a transmission side, a scrambling process is performed onto e (e is a natural number, m>e) encoded signals selected from the m encoded signals in descending order starting from the highest-frequency signal, and the e encoded signals including the highest-frequency signal that are subjected to the scrambling process and the remaining (m−e) encoded signals including the lowest-frequency signal are coded and multiplexed to generate the broadcast signal, said reception method comprising:
- extracting from the broadcast signal the e encoded signals including the highest-frequency signal and subjected to the scrambling process on the transmission side, performing a descrambling process onto the extracted signals, decoding the descrambled signals and the remaining (m−e) encoded signals including the lowest-frequency signal and unscrambled signals, combining decoded signals selected from among all the decoded signals in ascending order starting from the lowest-frequency signal in the frequency domain, in such a manner as to correspond in number to a designated resolution and generating a television signal which realizes the designated resolution.

* * * * *